United States Patent
Hiwatashi (10) Patent No.: US 8,611,945 B2
(45) Date of Patent: Dec. 17, 2013

(54) ELECTRONIC DEVICE

(75) Inventor: Kouji Hiwatashi, Yokohama (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 13/426,221

(22) Filed: Mar. 21, 2012

(65) Prior Publication Data

US 2012/0244912 A1 Sep. 27, 2012

(30) Foreign Application Priority Data

Mar. 24, 2011 (JP) .................. 2011-065463

(51) Int. Cl.
*H04M 1/00* (2006.01)
*H04B 1/08* (2006.01)
*H04R 25/00* (2006.01)

(52) U.S. Cl.
USPC ............. 455/550.1; 455/350; 455/575.1; 381/190; 381/191

(58) Field of Classification Search
USPC ......... 381/71.7, 116, 117, 189, 190; 455/350, 455/550.1, 566, 575.1
See application file for complete search history.

(56) References Cited

U.S. PATENT DOCUMENTS

| | | | | |
|---|---|---|---|---|
| 3,987,258 A | * | 10/1976 | Tsutsui et al. | 381/334 |
| 2001/0041543 A1 | * | 11/2001 | Lim | 455/90 |
| 2004/0097258 A1 | * | 5/2004 | Lee et al. | 455/550.1 |
| 2004/0203997 A1 | * | 10/2004 | Kaikuranta et al. | 455/550.1 |
| 2006/0078138 A1 | * | 4/2006 | Wada | 381/306 |
| 2007/0297637 A1 | * | 12/2007 | Sugiyama et al. | 381/398 |
| 2010/0290650 A1 | * | 11/2010 | Ogura et al. | 381/190 |

FOREIGN PATENT DOCUMENTS

JP 2000-201399 A 7/2000

* cited by examiner

*Primary Examiner* — Marisol Figueroa
*Assistant Examiner* — Erica Navar
(74) *Attorney, Agent, or Firm* — Hoffmann & Baron, LLP (57) ABSTRACT

An electronic device includes: a case member, at least a part of which is made of resin; and a speaker unit that is formed integrally with the case member, in which the speaker unit includes: a vibration generating unit; a vibrating plate that vibrates by vibration transmitted from the vibration generating unit; and a holding portion that holds an outer edge of the vibrating plate, a part or all of the holding portion being insert-molded into the case member.

13 Claims, 9 Drawing Sheets

ELECTRONIC DEVICE

This application is based on and claims the benefit of priority from Japanese Patent Application No. 2011-065463, filed on 24 Mar. 2011, the content of which is incorporated herein by reference.

BACKGROUND OF THE INVENTION

1. Field of the Invention

The present invention relates to an electronic device such as a cellular telephone device.

2. Related Art

Conventionally, some electronic devices such as cellular telephone devices have a speaker.

In addition, in recent years, the electronic devices are required to be smaller, and the electronic devices having a speaker are also required to be smaller and thinner.

In response to such requirements, a speaker using a piezoelectric element has been proposed as a thin speaker that can contribute to reducing the size of electronic devices (for example, Patent Document 1: Japanese Unexamined Patent Application, Publication No. 2000-201399).

However, in the electronic device disclosed in Patent Document 1, a frame that holds a vibrating plate with a piezoelectric element attached thereto has been required to be rigidly fixed to a cover member and the like, in order to be resistant to strong reaction forces applied from the vibrating plate.

In this case, in the electronic device, a double-stick tape, a fixing screw or the like has been required to be used for rigidly fixing the speaker to the cover member.

Moreover, the frame of the speaker has been required to have at least a size sufficient for tightly holding the vibrating plate. Such requirements have been one of factors in inhibiting the size of electronic devices from being reduced.

SUMMARY OF THE INVENTION

An object of the present invention is to provide an electronic device that has a speaker formed integrally with a cover member.

The present invention relates to an electronic device that includes: a case member, at least a part of which is made of resin; and a speaker unit that is formed integrally with the case member, in which the speaker unit includes: a vibration generating unit; a vibrating plate that vibrates by vibration transmitted from the vibration generating unit; and a holding portion that holds an outer edge of the vibrating plate, a part or all of the holding portion being insert-molded into the case member.

DETAILED DESCRIPTION OF THE INVENTION

Descriptions are hereinafter provided for a cellular telephone device as an electronic device of the present invention.

First of all, a cellular telephone device 1 in a first embodiment is described with reference to FIGS. 1 to 5C.

Figure 1:
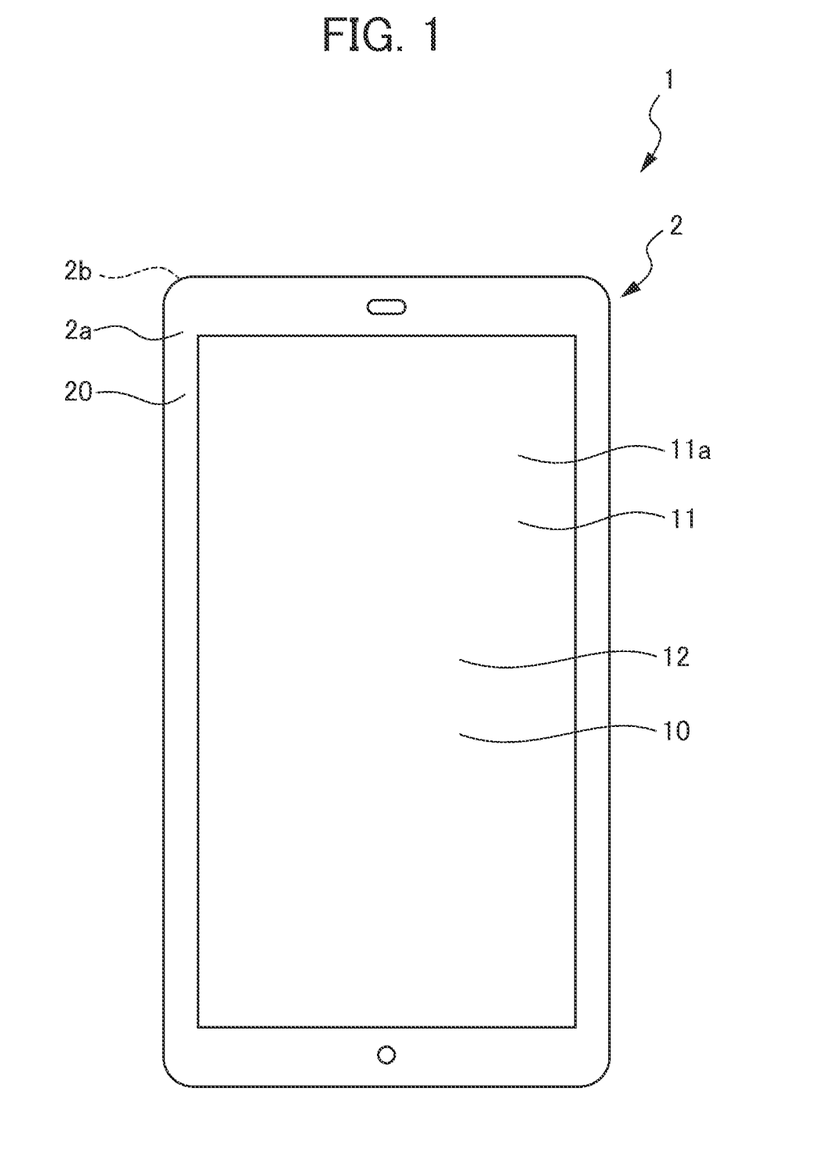
FIG. 1 is a front view of a cellular telephone device 1 in a first embodiment.
Figure 2:
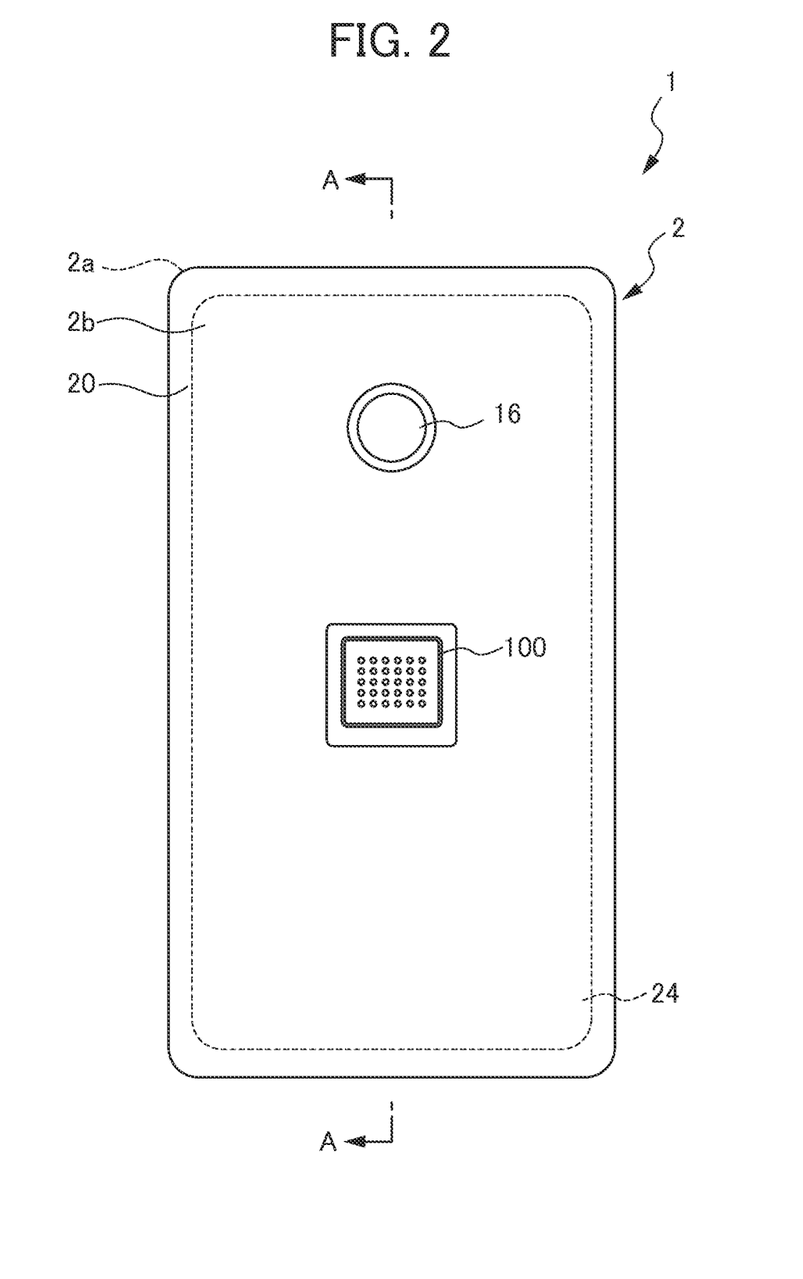
FIG. 2 is rear view of the cellular telephone device 1 in the first embodiment.
Figure 3:
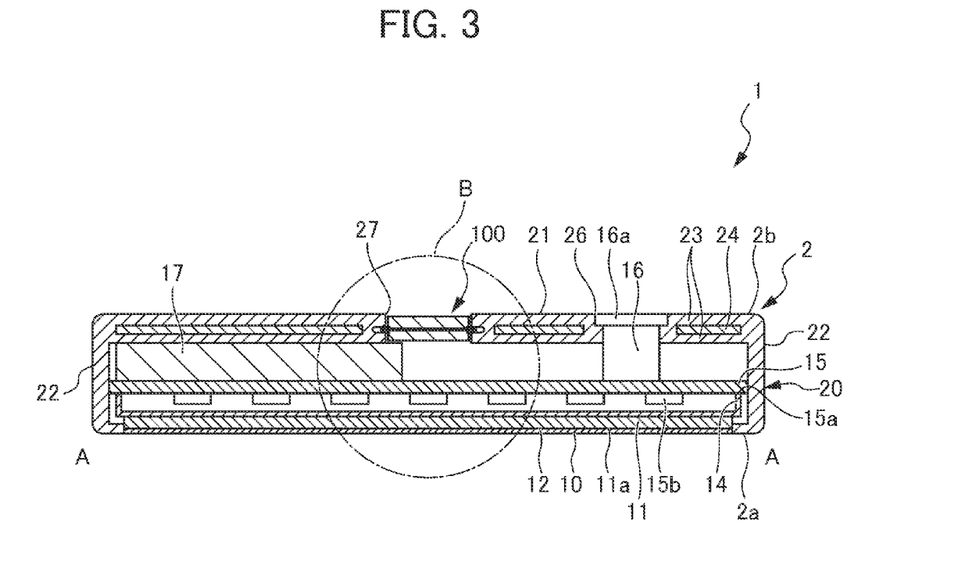
FIG. 3 is a cross-sectional view along A-A in FIG. 2.
Figure 4:
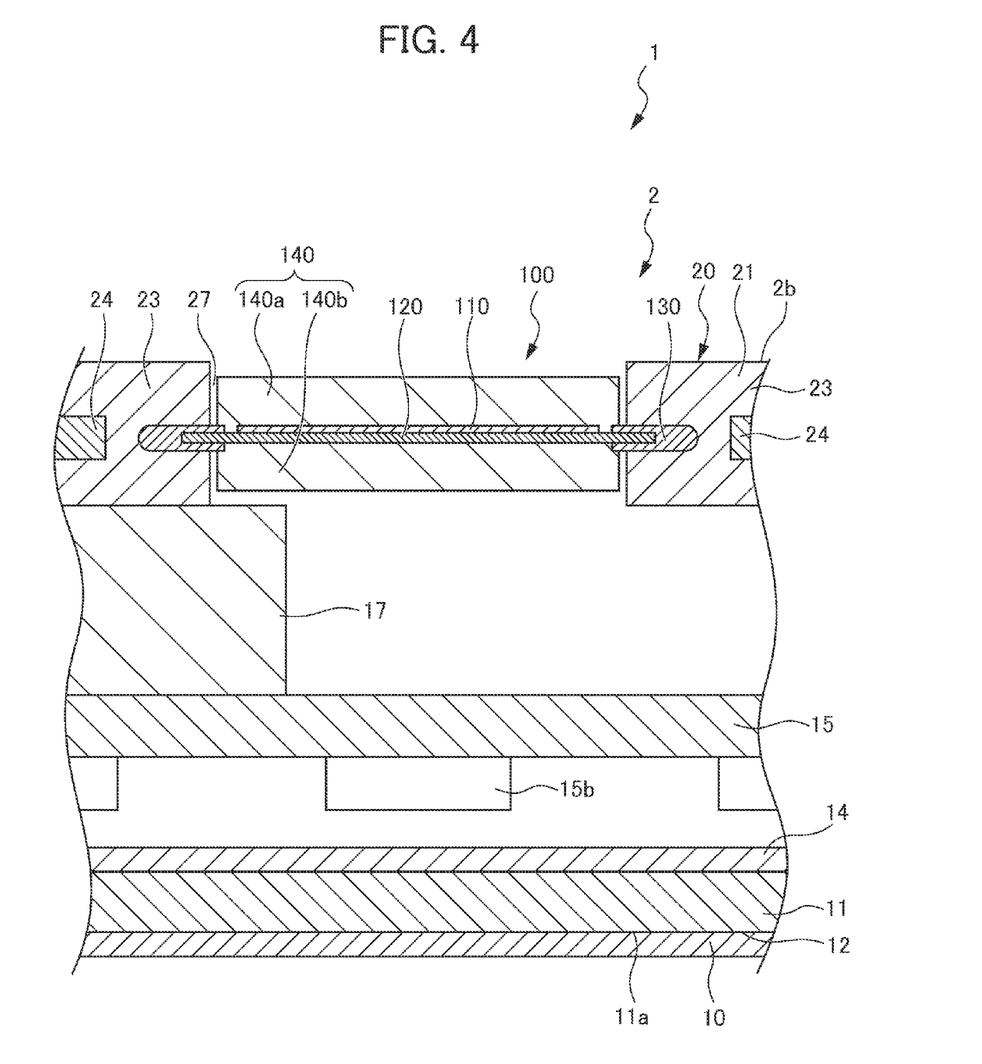
FIG. 4 is an enlarged view of a region B in FIG. 3.
Figure 5A:
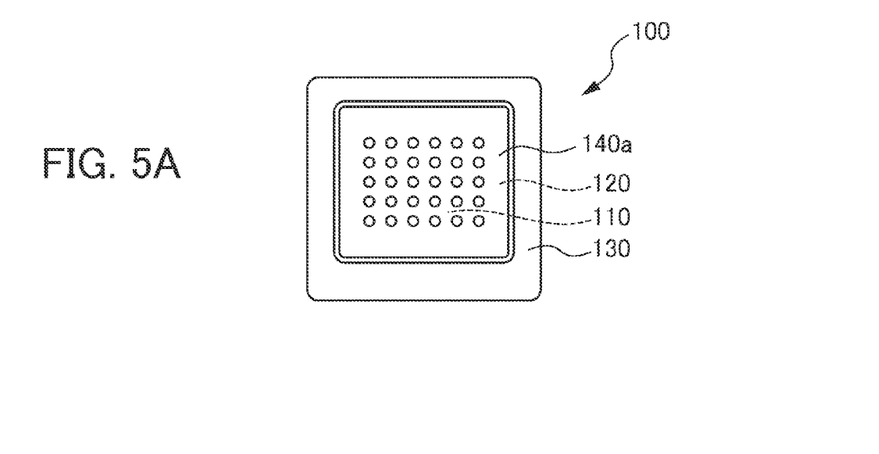
FIG. 5A is a front view of a speaker unit 100 in the first embodiment.
Figure 5B:
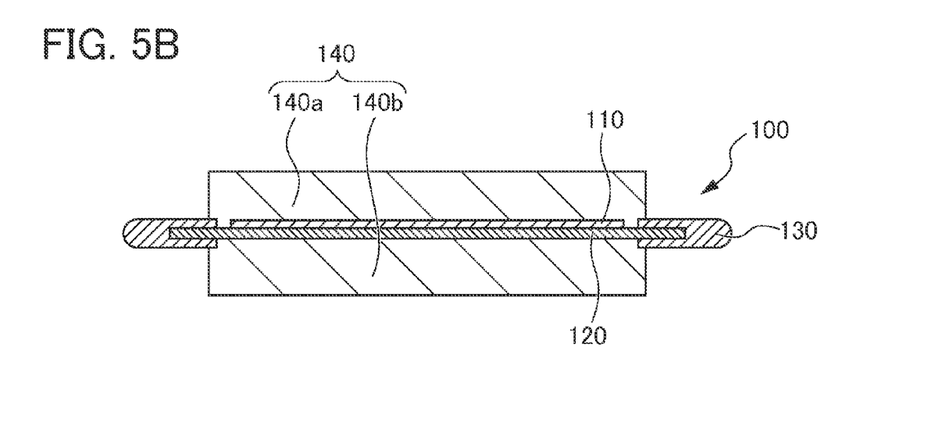
FIG. 5B is a side view of the speaker unit 100 in the first embodiment.
Figure 5C:
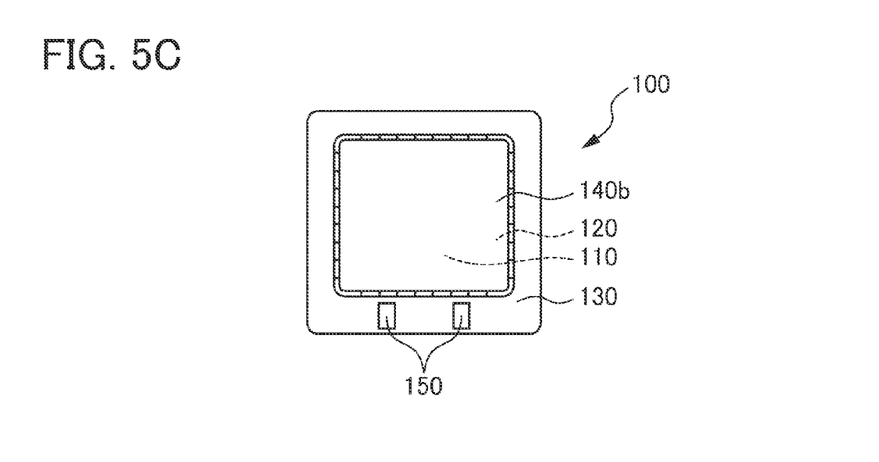
FIG. 5C is rear view of the speaker unit 100 in the first embodiment.

FIG. 1 is a front view of the cellular telephone device 1 in the first embodiment. FIG. 2 is rear view of the cellular telephone device 1 in the first embodiment. FIG. 3 is a cross-sectional view along A-A in FIG. 2. FIG. 4 is an enlarged view of a region B in FIG. 3. FIG. 5A is a front view of a speaker unit 100 in the first embodiment. FIG. 5B is a side view of the speaker unit 100 in the first embodiment. FIG. 5C is rear view of the speaker unit 100 in the first embodiment.

As shown in FIGS. 1 to 3, the cellular telephone device 1 includes a body 2.

The body 2 includes a protective panel 10, an LCD panel unit 11, a touch panel 12, a shielding case 14, a circuit board 15, a camera unit 16, a battery 17, the speaker unit 100, and a case member 20.

A contour of the body 2 is configured with the protective panel 10 and the case member 20, in which the protective panel 10 is disposed on a surface 2a side. Moreover, the protective panel 10 and the case member 20 form an internal space of the body 2.

The LCD panel unit 11, the touch panel 12, the shielding case 14, the circuit board 15, and the camera unit 16 as well as the battery 17 are housed in the body 2 (the internal space) in this order from the surface 2a side. Here, the speaker unit 100 is formed integrally with the case member 20. The speaker unit 100 is disposed such that a frame 130 (to be described later) is embedded in a flat wall portion 21 that configures the case member 20.

The protective panel 10 is disposed on an outer surface side (the surface 2a side) of the LCD panel unit 11 and the touch panel 12.

The protective panel 10 is a portion that is touched by a finger or the like of a user.

In addition, as described above, the protective panel 10 is a member that forms the contour of the body 2, together with the case member 20.

The LCD panel unit 11 has a display surface 11a.

The LCD panel unit 11 is housed and disposed in the body 2, such that the display surface 11a is visible from an outside. In the present embodiment, the LCD panel unit 11 is a display device using liquid crystals.

The LCD panel unit 11 is configured to include a driving circuit and a light source unit such as a backlight that emits light from a rear face side.

The LCD panel unit 11 is electrically connected to the circuit board 15 via a flexible printed circuit board and the like.

Here, a display device using organic EL (electroluminescence) or electronic ink may be used as a display member.

The touch panel 12 accepts an input from the outside. The touch panel 12 functions as an operation accepting unit that accepts operations from the user.

More specifically, the touch panel 12 detects a touch by a finger, a stylus or the like of the user on the protective panel 10. For example, a sensor used for the touch panel 12 employs a method such as a capacitive sensing method, a resistive film method, or an electromagnetic induction method.

The shielding case 14 is an electrically conductive member that has a shape of a thin rectangular parallelopiped, a large surface which is open. The shielding case 14 has: the flat plate portion that is disposed on the LCD panel unit 11 in a laminated manner; and ribs that extend from outer edges of the flat plate portion toward the circuit board 15 side.

The shielding case 14 is disposed so as to cover electronic components 15b (to be described later) that are mounted on the circuit board 15.

Furthermore, the shielding case 14 is disposed such that end faces of the ribs are mounted on a reference potential pattern 15a (to be described later) of the circuit board 15.

The circuit board 15 has: the reference potential pattern 15a that is formed on the shielding case 14 side; and the plurality of electronic components 15b that are mounted on the shielding case 14 side.

As described above, the end faces of the ribs of the shielding case 14 abut the reference potential pattern 15a. The plurality of electronic components 15b are covered by the shielding case 14.

Moreover, the circuit board 15 is electrically connected to the LCD panel unit 11 via the flexible printed circuit board and the like.

The camera unit 16 is disposed on the circuit board 15, on a side opposite to the shielding case 14.

The camera unit 16 is disposed such that a lens 16a side thereof is exposed to the outside of the body 2 through a camera hole 26.

The camera unit 16 is electrically connected to the circuit board 15 via a flexible printed circuit board (not illustrated).

The battery 17 is disposed on the circuit board 15, on the side opposite to the shielding case 14.

The battery 17 is inserted into an inside of the body 2 via a battery opening that is exposed by removing a battery cover (not illustrated).

The battery 17 is detachably disposed in the body 2 through the battery opening.

The case member 20 is a box-shaped member, the surface 2a side of which is open. As described above, the case member 20 configures the contour of the body 2, together with the protective panel 10.

The case member 20 is a case member, at least a part of which is made of resin.

The case member 20 has the flat wall portion 21 and a side wall portion 22 that extends from outer edges of the flat wall portion 2 toward the protective panel 10 side.

The flat wall portion 21 has a resin portion 23 and a sheet metal portion 24 that is disposed in an inside in a thickness direction. The flat wall portion 21 is formed by insert-molding the sheet metal portion 24. Since the sheet metal portion 24 is embedded in the inside of the flat wall portion 21, the rigidity of the flat wall portion 21 is improved.

The flat wall portion 21 has: the camera hole 26 through which the camera unit 16 is exposed; and a speaker hole 27 through which the speaker unit 100 is exposed.

As described above, the camera hole 26 exposes the lens 16a side of the camera unit 16, which is disposed in the inside of the body 2, to the outside.

The speaker hole 27 exposes a portion, which corresponds to a vibrating plate 120 of the speaker unit 100 (to be described later), to the outside.

An outer edge of the frame 130 of the speaker unit 100 (to be described later) is disposed in a state of being embedded in a portion of the resin portion 23, such a portion extending for a predetermined width from an outer edge of the speaker hole 27.

The speaker unit 100 is formed integrally with the case member 20. The speaker unit 100 is disposed such that the frame 130 (to be described later) is embedded in the flat wall portion 21 (the resin portion 23) that configures the case member 20.

Moreover, the speaker unit 100 is disposed on a side opposite to the side where the LCD panel unit 11 (to be described later) is disposed in the case member 21.

In addition, the speaker unit 100 is disposed so as not to protrude from an outer surface of the flat wall portion 21. An outer surface of the speaker unit 100 is positioned more inward to the inside of the case member 20 than the outer surface of the flat wall portion 21.

Furthermore, the speaker unit 100 is disposed in a central portion of the flat wall portion 100.

The speaker unit 100 has a piezoelectric element unit 110 (a vibration generating unit), the vibrating plate 120, the frame 130 (a holding portion), protective covers 140 (140a, 140b), and a power feed unit 150.

The piezoelectric element unit 110 (the vibration generating unit) is a thin member that is shaped like a sheet.

The piezoelectric element unit 110 is disposed on one surface side (an outer face side in the present embodiment) of the vibrating plate 120 (to be described later) in a laminated manner. The piezoelectric element unit 110 is disposed to be stuck on a central portion of the vibrating plate 120.

The piezoelectric element unit 110 has, for example, a structure in which a piezoelectric element is stuck on a metal plate, or a configuration in which a piezoelectric element is interposed between two electrodes.

The piezoelectric element unit 110 generates vibration by way of a voltage that is supplied via the power feed unit 150 (to be described later).

Since the piezoelectric element unit 110 is stuck on the vibrating plate 120, the vibration thus generated is transmitted to the vibrating plate 120.

The vibrating plate 120 is a square thin flat member. An outer edge of the vibrating plate 120 is held by the frame 130 (to be described later).

The vibrating plate 120 vibrates by the vibration transmitted from the piezoelectric element unit 110. The vibrating plate 120 vibrates such that the central portion thereof (a region in which the piezoelectric element unit 110 is disposed) moves up and down. Sound is generated by such vibration of the vibrating plate 120.

It is preferable for the vibrating plate 120 to have a water proof property. The vibrating plate 120 may be composed of, for example, a material having a water proof property (such as, for example, polyimide, polyethylene, or polycarbonate).

The frame 130 (the holding portion) holds the outer edge of the vibrating plate 120. The frame 130 is disposed so as to surround the outer edge of the vibrating plate 120. In the present embodiment, the frame 130 is formed to have a square ring shape. The frame 130 holds the vibrating plate 120 so as to interpose the outer edge of the vibrating plate 120 in the thickness direction. In the present embodiment, the frame 130 is made of metal.

A part or all of the frame 130 is insert-molded into the case member 20.

The frame 130 is attached to the case member 20 in a state where a part of the frame 130 is embedded in the flat wall portion 21.

Since the frame 130 is attached to the case member 20 by being embedded therein, the frame 130 is fixed in a state where the frame 130 does not move due to a force transmitted from the vibrating plate 120.

Moreover, an inner edge of a hole, which is formed for forming the speaker hole 27 in the sheet metal portion 24, is disposed adjacently to an outer edge of the frame 130, thereby improving the rigidity of the case member 20 (the flat wall portion 21).

The protective covers 140 (140a, 140b) are disposed by being stuck on both sides of the speaker unit 100. The protective cover 140a is disposed on a front face side (an outer face side) of the speaker unit 100. The protective cover 140a is disposed so as to cover one surface of the piezoelectric element unit 110 and the vibrating plate 120. In addition, the protective cover 140a is configured to have a plurality of holes.

The protective cover 140b is disposed on a rear face side (an inner face side) of the speaker unit 100. The protective cover 140b is disposed so as to cover another surface of the vibrating plate 120. Here, the protective cover 140b does not have a plurality of holes.

The power feed unit 150 is disposed (formed) on the rear face side (the inner face side) of the speaker unit 100. The power feed unit 150 is disposed in a region that is formed by cutting out a part of the frame 130.

The power feed unit 150 is supplied with voltage from the circuit board 15 via the flexible printed circuit board (not illustrated) and the like. The power feed unit 150 feeds the voltage supplied from the circuit board 15 to the piezoelectric element unit 110.

Here, since the speaker unit 100 is of a type using a piezoelectric element, a magnet and the like are not required. The speaker unit 100 using the piezoelectric element of the present embodiment is of a thin type, and does not magnetically affect the other electronic components.

According to the present embodiment, since the frame 130 of the speaker unit 100 is embedded in the flat wall portion 21, the shape of the cellular telephone device 1 can be made thinner.

Furthermore, according to the present embodiment, since the frame 130 of the speaker unit 100 is embedded in the flat wall portion 21, the size of the cellular telephone device 1 can be made smaller in a longitudinal direction or a lateral direction, by such a size of the frame 130.

Moreover, according to the present embodiment, in the cellular telephone device 1, since the frame 130 of the speaker unit 100 is embedded in the flat wall portion 21, the speaker unit 100 can be rigidly fixed without a gap.

In addition, according to the present embodiment, in the cellular telephone device 1, since the frame 130 of the speaker unit 100 is embedded in the flat wall portion 21, the speaker unit 100 can be attached to the case member 20 without using a member or the like for fixing the speaker unit 100 to the case member 20 (a double-stick tape or a screw).

As a result, with the cellular telephone device 1, it is possible to reduce the number of required members (parts). Furthermore, as a result, with the cellular telephone device 1, it is possible to reduce the manufacturing cost.

Moreover, as a result, with the cellular telephone device 1, it is possible to suppress adverse effects due to malfunction of a member for fixing the speaker unit 100 to the case member 20 (a double-stick tape or a screw), deviation of attachment positions, insufficient depression at the time of attachment, and the like.

In addition, according to the present embodiment, in the cellular telephone device 1, since the frame 130 of the speaker unit 100 is embedded in the flat wall portion 21, it is not necessary to form a planar region for fixing the speaker unit 100 to the case member 20, thereby making it possible to reduce the workload in the manufacturing.

Furthermore, according to the present embodiment, in the cellular telephone device 1, since the frame 130 of the speaker unit 100 is embedded in the flat wall portion 21, a manner of disposing the speaker unit 100 is not limited. For example, the speaker unit 100 may be disposed in a position overlapping with the battery in the thickness direction. In other words, the design freedom in the cellular telephone device 1 is improved.

Moreover, according to the present embodiment, in the cellular telephone device 1, since the frame 130 of the speaker unit 100 is embedded in the flat wall portion 21 by insert-molding thereof using a mold, it is possible to enhance the positional accuracy of the speaker unit 100.

In addition, according to the present embodiment, in the cellular telephone device 1, since the frame 130 of the speaker unit 100 is embedded in the flat wall portion 21, it is possible to suppress aged deterioration occurring after fixing the speaker unit 100, and to suppress adverse effects due to heat (for example, deterioration of an adhesive tape).

Furthermore, according to the present embodiment, in the cellular telephone device 1, since the frame 130 of the speaker unit 100 is embedded in the flat wall portion 21, the frame 130 is tightly held. As a result, the cellular telephone device 1 suppresses the frame 130 from moving due to reaction forces from the vibrating plate 120, thereby improving the acoustic performance.

Moreover, according to the present embodiment, in the cellular telephone device 1, since the frame 130 of the speaker unit 100 is embedded in the flat wall portion 21, even if the size of the vibrating plate 120 and the like is increased, it is not necessary to increase the size (the thickness and the like) of the frame 130. As a result, the cellular telephone device 1 can improve the speaker performance without increasing the size.

In addition, according to the present embodiment, in the cellular telephone device 1, since the frame 130 of the speaker unit 100 is embedded in the flat wall portion 21, the water proof property is improved. Moreover, in the cellular telephone device 1, since a waterproof sealing member and the like are not required for the speaker unit 100, it is possible to reduce the cost for improving the water proof property.

Furthermore, if the vibrating plate 120 is composed of a material having a water proof property, the water proof property of the cellular telephone device 1 is further improved.

Moreover, according to the present embodiment, in the speaker unit 100, the piezoelectric element unit including the piezoelectric element is used as the vibration generating unit.

As a result, the cellular telephone device 1 has the thin speaker unit 100 that does not require a magnet.

As a result, the shape of the cellular telephone device 1 can be made thinner, and it is possible to achieve a configuration that is less restricted by a magnetic force that influences a manner of disposing the components.

In addition, according to the present embodiment, in the case member 20, the outer edge of the frame 130 of the speaker unit 100 (the insert-molded frame 130) is disposed adjacently to the vicinity of the inner edge of the hole (the portion corresponding to the speaker hole 27) that is formed in the sheet metal portion 24 that is insert-molded for improving the rigidity. As a result, the rigidity of the cellular telephone device 1 is improved.

Furthermore, according to the present embodiment, in the cellular telephone device 1, the frame 130 is configured to be electrically connected to a ground that is formed in the circuit board 15, thereby making it possible to suppress adverse effects from occurring in a case of static electricity being charged.

Moreover, according to the present embodiment, in the cellular telephone device 1, since the frame 130 of the speaker unit 100 is embedded in the flat wall portion 21, the shape of the speaker unit 100 to be attached is not limited.

In addition, according to the present embodiment, in the cellular telephone device 1, since the frame 130 of the speaker unit 100 is embedded in the flat wall portion 21, the size and shape of the frame 130 of the speaker unit 100 to be attached are not limited.

Next, a cellular telephone device 1A in a second embodiment is described with reference to FIGS. 6 and 7.

Figure 6:
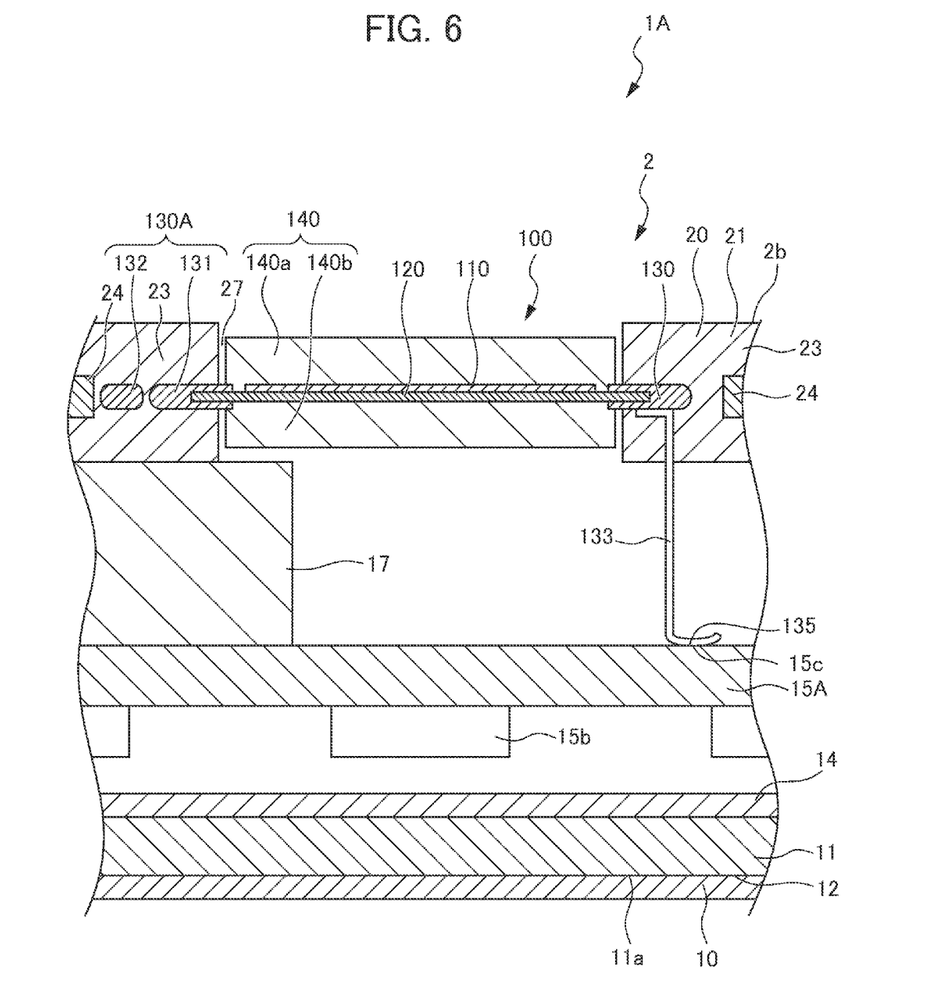
FIG. 6 is a partially enlarged cross-sectional view of a cellular telephone device 1A in a second embodiment.

FIG. 6 is a partially enlarged cross-sectional view of the cellular telephone device 1A in the second embodiment. FIG. 7 is a rear view of a speaker unit 100A in the second embodiment.

In the following, descriptions are omitted for configurations similar to those of the cellular telephone device 1 described above, and descriptions are mainly provided for different configurations.

Figure 7:
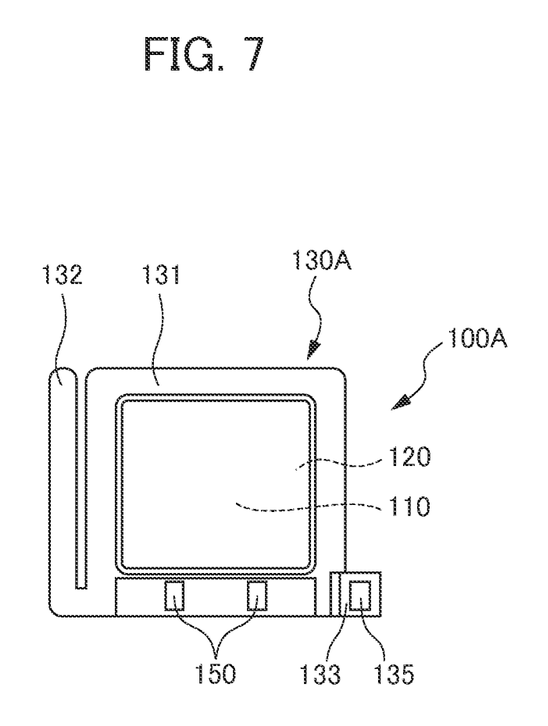
FIG. 7 is a rear view of a speaker unit 100A in the second embodiment.

As shown in FIGS. 6 and 7, a shape of a frame 130A of the speaker unit 100A in the present embodiment is different from the shape of the frame 130 of the speaker unit 100 in the first embodiment. In the present embodiment, the frame 130A is composed of a conductive member (for example, metal).

Moreover, the speaker unit 100A in the present embodiment is different from the speaker unit 100 in the first embodiment in having an extending portion 133 and an antenna side power receiving portion 135.

In addition, a circuit board 15A in the present embodiment is different from the circuit board 15 in the first embodiment in having an antenna power feed unit 15c that is abutted by an antenna side power receiving portion 135, and is capable of feeding electrical power to an antenna unit 132 (to be described later) via the antenna side power receiving portion 135.

More specifically, the frame 130A of the speaker unit 100A has: an outer circumferential portion 131 that is disposed at an outer edge (an outer circumference) of the vibrating plate 120; and an antenna unit 132 that is formed by extending from the outer circumferential portion 131.

The outer circumferential portion 131 is a portion that holds the vibrating plate 120.

The antenna unit 132 is a portion that linearly extends along the outer edge of the outer circumferential portion 131 for a predetermined width.

Furthermore, the frame 130A of the speaker unit 100A has the extending portion 133 that extends from a face on the circuit board 15A side of the outer circumferential portion 131.

The extending portion 133 has the antenna side power receiving portion 135 that is formed in an end portion of the circuit board 15A side.

The antenna side power receiving portion 135 is electrically connected to (in the present embodiment, abuts) the antenna power feed unit 15c that is formed on the speaker unit 100A side of the circuit board 15A.

The antenna power feed unit 15c is configured to be capable of feeding electrical power to the antenna unit 132 (to be described later) via the antenna side power receiving portion 135.

With the aforementioned configuration, the antenna unit 132 of the frame 130A functions as an antenna. A shape and an extending length of the antenna unit 132 (the frame 130A) are set in conformity with compatible frequency (wavelength).

Moreover, the antenna unit 132 is connected to an RF module and the like (not illustrated) mounted on the circuit board 15A, via the antenna power feed unit 15c and the antenna side power receiving portion 135.

According to the present embodiment, in the cellular telephone device 1A, it is possible to utilize a part of the frame 130A as an antenna. As a result, in the cellular telephone device 1A, it is possible to effectively utilize the frame 130A of the speaker unit 100A.

In addition, according to the present embodiment, in the cellular telephone device 1A, since the antenna unit 132 is embedded in the flat wall portion 21, it is possible to achieve space-saving.

Furthermore, according to the present embodiment, in the cellular telephone device 1A, since the antenna unit 132 is embedded in the flat wall portion 21, it is possible to suppress the antenna unit 132 from being broken or the like.

Moreover, according to the present embodiment, in the cellular telephone device 1A, since the antenna unit 132 is embedded in the flat wall portion 21, the antenna unit 132 is positioned with high accuracy. As a result, in the cellular telephone device 1A, the workload of assembly operations is reduced.

Next, a cellular telephone device 1B in a third embodiment is described with reference to FIG. 8.

Figure 8:
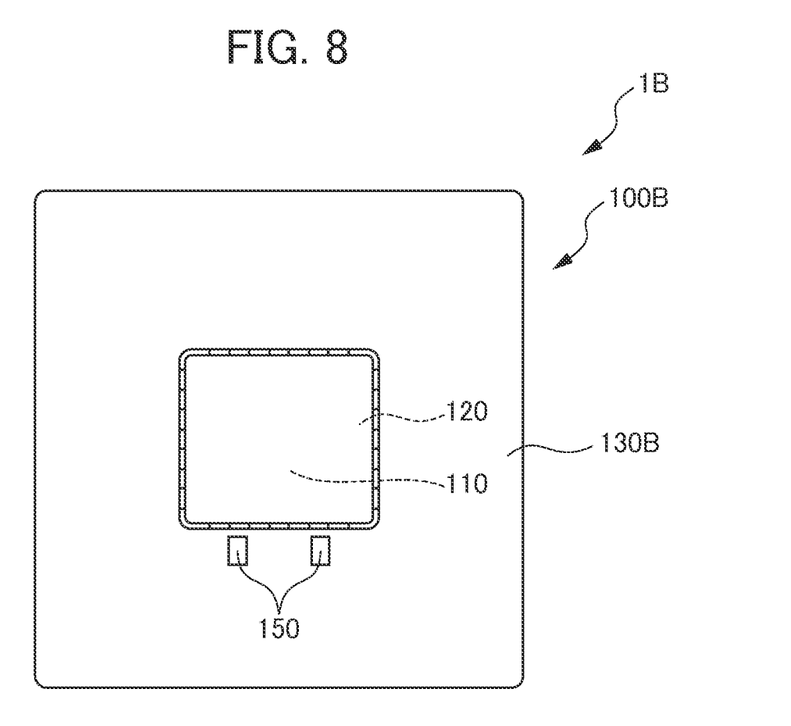
FIG. 8 is a rear view of a speaker unit 100B in a third embodiment.

FIG. 8 is a rear view of a speaker unit 100B in the third embodiment.

In the following, descriptions are omitted for configurations similar to those of the cellular telephone device 1 described above, and descriptions are mainly provided for different configurations.

As shown in FIG. 8, a size of a frame 130B of the speaker unit 100B in the present embodiment is larger than the frame 130 of the speaker unit 100 in the first embodiment.

For example, in the frame 130B, an area of the frame 130B viewed from a direction perpendicular to the vibrating plate 120 (the direction perpendicular to a page space in FIG. 8) is larger than an area of the vibrating plate 120 surrounded by the frame 130B viewed from the perpendicular direction.

Moreover, the size of the frame 130B is not required to be accurate.

According to the present embodiment, in the cellular telephone device 1B, since the size of the frame 130B can be increased, the manufacturing is facilitated.

In addition, according to the present embodiment, in the cellular telephone device 1B, since the size of the frame 130B is not required to be accurate, it is possible to suppress the number of defective components and the like.

Furthermore, according to the present embodiment, in the cellular telephone device 1B, since the size of the frame 130B can be increased, it is possible to improve the rigidity around the speaker unit 100B in the case member 20.

Next, a cellular telephone device 1C in a fourth embodiment is described with reference to FIG. 9.

Figure 9:
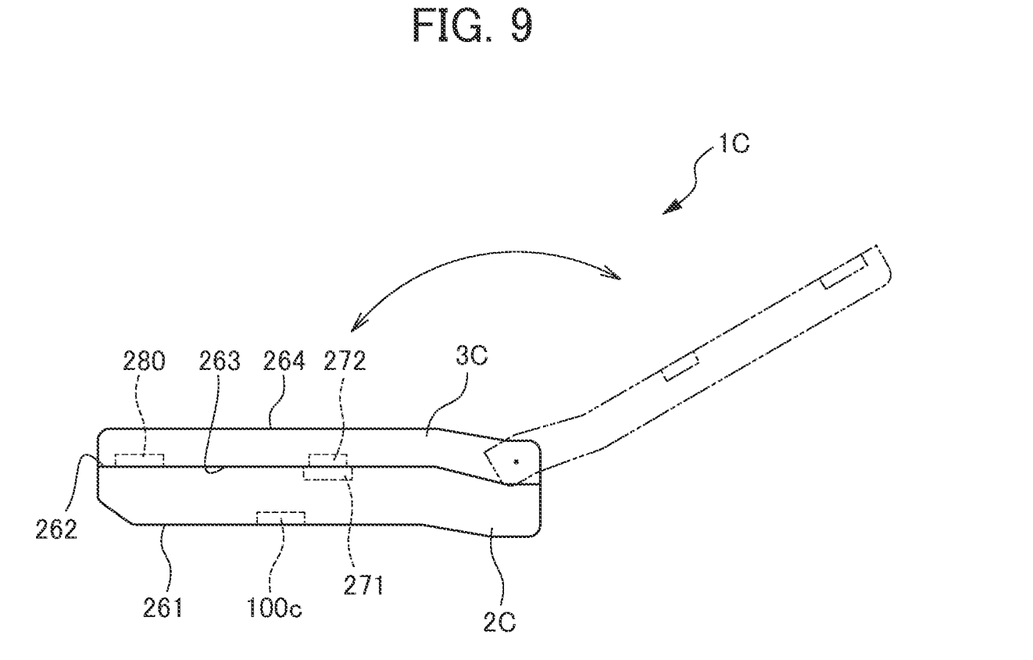
FIG. 9 is a side view of a cellular telephone device 1C in a fourth embodiment.

FIG. 9 is a side view of the cellular telephone device 1C in the fourth embodiment.

In the following, descriptions are omitted for configurations similar to those of the cellular telephone device 1 described above, and descriptions are mainly provided for different configurations.

As shown in FIG. 9, the cellular telephone device 1C is a cellular telephone device of a folder type (an opening-andclosing type). The cellular telephone device 1C is configured to be capable of changing its state into an opened state and a closed state.

The cellular telephone device 1C has a first body 2C, a second body 3C, and a connecting portion 4C.

The first body 2C is configured to include the case member 20.

The first body 2C has: a first face 261, in which a speaker unit 100c is disposed; and a second face 262 that is opposite to the first face 261.

A magnetic sensor 271 (an opening-and-closing sensor) is disposed on the second face 262 side of the first body 2C.

The second body 3C has a third face 263 and a fourth face 264 that is opposite to the third face 263.

Here, a magnet 272 is disposed on the third face 263 side of the second body 3C. In the closed state of the cellular telephone device 1C, the magnet 272 is disposed adjacently to the magnetic sensor 271.

Moreover, a speaker 280 for a telephone call is disposed on the third face 263 side of the second body 3C, at another end in the longitudinal direction.

The connecting portion 4C pivotally connects the first body 2C and the second body 3C.

The connecting portion 4C connects one end side in a longitudinal direction of the first body 2C and one end side in a longitudinal direction of the second body 3C.

The connecting portion 4C connects the first body 2C and the second body 3C so as to be capable of changing between: the closed state in which the second face 262 is disposed adjacently to the third face 263; and the opened state in which the second face 262 is disposed separately from the third face 263.

Here, as shown in FIG. 9, in the cellular telephone device 1C (in the closed state), the speaker unit 100C is disposed in a position that is close to the magnetic sensor 271 and the magnet 272, and the position is relatively close to the speaker 280 for a telephone call as well.

However, since the speaker unit 100C uses the piezoelectric element in the vibration unit, the speaker unit 100C is configured without a magnet.

As a result, according to the present embodiment, since the cellular telephone device 1C is not affected by adverse effects due to a magnetic force from the speaker unit 100C, the degree of freedom is high in disposing the magnetic sensor 271 (the opening-and-closing sensor) and the speaker 280 for a telephone call.

Although the preferable embodiments have been described above, the present invention is not limited to the aforementioned embodiments, and can be implemented as various embodiments. For example, although the cellular telephone device 1 is described as an electronic device in the aforementioned embodiments, the present invention is not limited thereto, and the portable electronic device may be a PHS (Personal Handyphone System), a PDA (Personal Digital Assistant), a portable navigation device, a notebook PC or the like.

Moreover, in the aforementioned embodiments, although the speaker unit is of a piezoelectric type using the piezoelectric element as the vibration unit, the speaker unit is not limited thereto, and may be of, for example, a dynamic type or the like.

In addition, although the cellular telephone device is of the straight type in the first to third embodiments, the cellular telephone device is not limited thereto, and for example, the cellular telephone device may be of; the opening-and-closing type (the folder type) as described in the fourth embodiment; a so-called 2-axis hinge type that can be opened and closed as well as rotated; or a slider type in which one of bodies slides to one direction in a state in which a operation unit side body 2 and a display unit side body are mutually superimposed.

What is claimed is:

1. An electronic device, comprising:
    a case member, at least a part of which is made of resin; and
    a speaker unit that is formed integrally with the case member, the speaker unit including:
    a vibration generating unit;
    a vibrating plate that vibrates by vibration transmitted from the vibration generating unit; and
    a holding portion that holds an outer edge of the vibrating plate, a part or all of the holding portion being insert-molded into the case member such that the holding portion is in contact with and holds the outer edge of the vibrating plate but does not move in response to a force transmitted from the vibrating plate.

2. The electronic device according to claim 1, wherein the vibrating plate has a water proof property.

3. The electronic device according to claim 1, further comprising:
    a substrate that is housed in the case member, the substrate including a power feed unit,
    wherein the holding portion is composed of a conductive member, and includes an abutted portion that is electrically connected to the power feed unit.

4. The electronic device according to claim 3, wherein the holding portion functions as an antenna.

5. The electronic device according to claim 1, wherein the vibration generating unit is composed of a piezoelectric element, and is disposed on one surface of the vibrating plate in a laminated manner.

6. The electronic device according to claim 5, further comprising:
    a first body that is configured to include the case member, the first body including a first face in which the speaker unit is disposed, and a second face that is opposite to the first face;
    a second body that includes a third face and a fourth face that is opposite to the third face; and
    a connecting portion that pivotally connects the first body and the second body,
    wherein the connecting portion connects one end side in a longitudinal direction of the first body with one end side in a longitudinal direction of the second body,
    wherein the connecting portion connects the first body with the second body so as to be capable of changing a state between a closed state in which the second face is disposed adjacently to the third face, and an opened state in which the second face is disposed separately from the third face,
    wherein a magnetic sensor is disposed on a second face side of the first body, and
    wherein, on a third face side of the second body, a magnet is disposed in a position in which the magnet is disposed adjacently to the magnetic sensor in the closed state, and a speaker is disposed on another end side in the longitudinal direction.

7. The electronic device according to claim 1, wherein, in the holding portion, an area of the holding portion viewed from a direction perpendicular to the vibrating plate is larger than an area of the vibrating plate surrounded by the holding portion viewed from the direction perpendicular to the vibrating plate.

8. The electronic device according to claim 1, further comprising:

a display unit that is disposed on one surface side of the case member, wherein, in the case member, the speaker unit is disposed on a side opposite to the display unit.

9. The electronic device according to claim 1, wherein the speaker unit is disposed in a central portion of one surface of the case member.

10. The electronic device according to claim 1, wherein an outer surface of the speaker unit is positioned more inward to an inside of the case member than an outer surface of the case member in which the speaker unit is disposed.

11. An electronic device, comprising:

a case member that includes at least a resin portion; and a speaker unit, an outer edge of which is embedded in the resin portion of the case member, the speaker unit including:

a vibration generating unit;

a vibrating plate that vibrates by vibration transmitted from the vibration generating unit; and a holding portion that holds an outer edge of the vibrating plate, an outer edge of the holding portion being embedded in the resin portion such that the holding portion is in contact with and holds the outer edge of the vibrating plate but does not move in response to a force transmitted from the vibrating plate.

12. The electronic device according to claim 1, wherein the holding portion holds a top face, a bottom face and a side face of the outer edge of the vibrating plate.

13. The electronic device according to claim 11, wherein the holding portion holds a top face, a bottom face and a side face of the outer edge of the vibrating plate.

* * * * *